Patented Mar. 20, 1951

2,545,656

UNITED STATES PATENT OFFICE 2,545,656

MODIFICATION OF PROLAMINS WITH GLYCOLS

John P. Dunne, New York, N. Y., assignor to Columbian Carbon Company, New York, N. Y., a corporation of Delaware No Drawing. Original application July 19, 1947, Serial No. 762,211. Divided and this application August 17, 1949, Serial No. 110,896

7 Claims. (Cl. 260—123)

This invention relates to a method for the production of modified prolamins which are characterized by increased miscibility with water and other desirable properties.

It is known in the art to prepare solutions of prolamins (e. g., zein), the prolamins being dissolved in aqueous ethanol, or in glycols or polyglycols. Such solutions have little or no tolerance for water, and the addition of sufficient water thereto causes precipitation of the prolamin. Prolamin emulsions or dispersions in water have also been made using soaps, particularly rosin soaps, sulfated oils, etc. However, such emulsions or dispersions may be prepared only in low solids content. Furthermore, such emulsions or dispersions are of limited stability.

It is therefore an object of this invention to provide a method for the modification of a prolamin to provide a product of increased miscibility with water.

It is another object of this invention to provide a method for the production of a modified prolamin which is infinitely miscible with water.

It is also an object of this invention to provide a method for the production of a modified zein which is infinitely miscible with water.

It is a further object of this invention to provide a method for the modification of a prolamin, particularly zein, to form a product which is infinitely miscible with water and which may be incorporated into water to form stable solutions which are not affected by air, light or the normal temperatures of storage.

The foregoing and other objects are accomplished in accordance with the present invention by heating a prolamin in contact with a mixture containing certain glycols or polyglycols and a strong alkali.

For a more complete understanding of the present invention, reference is made to the following example, which is to be considered not limitative of the invention.

Example 712 gms. of propylene glycol was charged to a reaction flask equipped with a reflux condenser, and 80 gms. of zein and 8 gms. of dry sodium hydroxide were mixed therein. The temperature of the reaction mixture was then raised to 110° C., and held at that temperature for one-half hour. At this point, a sample of the reaction mixture could be diluted with up to about an equal weight of water at room temperature without precipitating zein from the solution. After the reaction mixture had been heated for an additional one-half hour at the same temperature, it was miscible with water in all proportions at room temperature, and aqueous solutions thereof were stable over an extended period of time.

The foregoing example illustrates the method of the present invention for the modification of a prolamin to render it more completely miscible with water by heating the prolamin in a mixture with a glycol or polyglycol and a strong alkali. In the example zein was the specific prolamin which was modified. However, for zein there may be substituted in the example any other prolamin, such as gliadin, hordein or kafarin, or mixtures of the aforementioned prolamins.

Furthermore, in place of the propylene glycol employed in the example, there may be substituted any other glycol or polyglycol which is infinitely miscible with water at 20° C. (e. g., ethylene glycol, trimethylene glycol, diethylene glycol, dipropylene glycol, triethylene glycol, tetraethylene glycol, tripropylene glycol. "Polyethylene Glycol 200" (a proprietary mixture of polyethylene glycols having an everage molecular weight of 190–210), "Polyethylene Glycol 400" (a proprietary mixture of polyethylene glycols having an average molecular weight of 380–420 and a freezing range of 4–10° C.), "Polyethylene Glycol 600" (a proprietary mixture of polyethylene glycols having an average molecular weight of 570–630 and a freezing range of 20–25° C.), etc., or polyethylene glycol which is not infinitely miscible with water at 20° C. but which has a molecular weight below about 1600 (e. g., "Carbowax Compound 1000" (a proprietary mixture of polyethylene glycols having an average molecular weight of 950–1050 and a freezing range of 35–40° C.), "Carbowax Compound 1500" (a proprietary mixture of polyethylene glycols having an average molecular weight of 500–600 and a freezing range of 35–40° C.), "Carbowax Compound 1540" (a proprietary mixture of polyethylene glycols having an average molecular weight of 1300–1600 and a freezing range of 40–50° C.), etc.), or mixtures thereof.

The relative proportions of prolamin and glycol or polyglycol may be varied over a wide range, depending upon the particular prolamin employed, the particular glycol or polyglycol used, the characteristics desired in the reaction product, etc. Thus, when propylene glycol and refined zein are employed, the minimum amount of glycol required is approximately 1.6 parts by weight per part of zein, if a product which is completely miscible with water is to result from the reaction. Somewhat greater amounts of glycol and polyglycol of higher molecular weight than propylene glycol are required if the same effect is to be produced. With ethylene glycol a somewhat smaller amount thereof may be used if a similar result is to be obtained using zein.

As the example illustrates, the modification of the prolamin may be effected using as a catalyst sodium hydroxide. However, in place of the sodium hydroxide there may be substituted any other strongly alkaline material, such as potassium hydroxide, lithium hydroxide, tetramethylammonium hydroxide, etc., or materials which decompose under the reaction conditions to yield strongly alkaline materials, such as sodium acetate, potassium oxalate, sodium citrate, sodium lactate, sodium formate, etc., or mixtures thereof. In general, the reaction mixture should preferably contain from about 2 to about 20 parts of strongly basic material per 100 parts of prolamin contained therein.

In the example, the modification of the prolamin was effected by heating the reaction mixture at 110° C. for a period of time. A wide range of reaction temperatures may be employed in practicing the method of the present invention, such temperatures generally being in the range from about 80 to about 120° C., and preferably from about 100–120° C. The temperature of the reaction mixture should not be allowed to rise substantially above about 120° C., as some decomposition of the prolamin may take place at higher temperatures.

The reaction of the prolamin and the glycol or polyglycol may be carried out in any suitable vessel, such as a jacketed dough mixer, a jacketed kettle preferably equipped with a reflux condenser, etc. The preferred method of effecting the reaction is to add the prolamin and strongly alkaline material to the glycol or polyglycol while the glycol or polyglycol is heated and agitated, the addition of the prolamin and strongly alkaline material being made when the temperature of the glycol or polyglycol has reached 60–80° C. When the proportion of glycol or polyglycol to prolamin is less than about three to one by weight, it is preferred to use a closed, jacketed mixer because of the relatively high viscosity of the mixture.

The period of time during which the reaction mixture is heated will depend upon various factors, such as the particular reactants employed and their relative proportions, the reaction temperature, the properties desired in the final product, etc. The water tolerance usually varies from about 40 to about 50% (i. e., from about 40 to about 50 gms. of water per 100 gms. of reaction mixture at room temperature) when the prolamin first completely dissolves in the glycol or polyglycol to infinite water tolerance after from one to four hours of heating at 110° C. The reaction time required to attain infinite water tolerance is somewhat reduced as the amount of glycol or polyglycol and/or strongly alkaline material present is increased.

Prolamins which have been modified in accordance with the method described herein are valuable compositions of matter in that they have increased or total miscibility in water, and hence may be used in the production of improved printing inks, water-dilutable paints and varnishes, adhesives, as binders for pigments and fillers in molding compositions, as a modifier and extender for synthetic resins such as phenol-formaldehyde resins, and for other purposes.

As a specific illustration of the use of the composition of the present invention, a letterpress ink which is very stable on storage and which flash dries rapidly, has good hiding power and prints sharp and clean may be prepared by mixing in the known manner 78 parts of the final product of the example, 1 part of milori blue, 20 parts of carbon black and 1 part of methyl violet. In addition, pigments other than carbon black may be incorporated into the composition of the present invention to form a printing ink, for example, by mixing 78.8 parts of the final product of the example, 10.0 parts of calcium carbonate and 11.2 parts of Lithol red.

This application is a division of my copending application Ser. No. 762,211, filed July 19, 1947, now United States Patent No. 2,489,763.

I claim:

1. The method for the modification of a prolamin to increase its miscibility with water which comprises heating the prolamin in admixture with a material selected from the group consisting of glycols and polyglycols which are infinitely miscible with water at 20° C. and polyethylene glycols which are not infinitely miscible with water at 20° C. but which have a molecular weight below about 1600 and a material selected from the group consisting of strong alkalis and compounds which under the reaction conditions decompose to yield strong alkalis, the heating being conducted at a temperature not in excess of 120° C.

2. The method for the modification of zein to increase its miscibility with water which comprises heating the zein in admixture with a material selected from the group consisting of glycols and polyglycols which are infinitely miscible with water at 20° C. and polyethylene glycols which are not infinitely miscible with water at 20° C. but which have a molecular weight below about 1600 and a material selected from the group consisting of strong alkalis and compounds which under the reaction conditions decompose to yield strong alkalis, the heating being conducted at a temperature not in excess of 120° C.

3. The method for the modification of a prolamin to increase its miscibility with water which comprises heating the prolamin in admixture with propylene glycol and a material selected from the group consisting of strong alkalis and compounds which under the reaction condition decompose to yield strong alkalis, the heating being conducted at a temperature not in excess of 120° C.

4. The method for the modification of a prolamin to increase its miscibility with water which comprises heating the prolamin in admixture with a material selected from the group consisting of glycols and polyglycols which are infinitely miscible with water at 20° C. and polyethylene glycols which are not infinitely miscible with water at 20° C. but which have a molecular weight below about 1600 and sodium hydroxide, the heating being conducted at a temperature not in excess of 120° C.

5. The method for the modification of a prolamin to increase its miscibility with water which comprises heating the prolamin in admixture with a material selected from the group consisting of glycols and polyglycols which are infinitely miscible with water at 20° C. and polyethylene glycols which are not infinitely miscible with water at 20° C., but which have a molecular weight below about 1600 and a material selected from the group consisting of strong alkalis and compounds which under the reaction conditions decompose to yield strong alkalis, the heating being conducted at a temperature within the range of about 80° to 120° C.

6. The method for the modification of zein to increase its miscibility with water which comprises heating the zein in admixture with propylene glycol and sodium hydroxide at a temperature within the range of about 80° to 120° C.

7. The method for the modification of a prolamin to increase its miscibility with water which comprises heating the prolamin in admixture with a material selected from the group consisting of glycols and polyglycols which are infinitely miscible with water at 20° C. and polyethylene glycols which are not infinitely miscible with water at 20° C. but which have a molecular weight below about 1600 and a material selected from the group consisting of strong alkalis and compounds which under the reaction conditions decompose to yield strong alkalis, the heating being conducted for a period of time within the range of ½ to 4 hours at a temperature within the range of 80° to 120° C.

JOHN P. DUNNE.

No references cited.